United States Patent

Yasuda et al.

[11] 4,031,867
[45] June 28, 1977

[54] INTERNAL COMBUSTION ENGINE COMBUSTION PROCESS

[75] Inventors: Hiroki Yasuda, Hachioji; Shuji Sawafuji, Musashino; Hitoshi Suzuki, Chofu, all of Japan

[73] Assignee: Fuji Jukogyo Kabushiki Kaisha, Tokyo, Japan

[22] Filed: Dec. 18, 1975

[21] Appl. No.: 641,738

[30] Foreign Application Priority Data

Dec. 28, 1974 Japan .................................. 50-3275

[52] U.S. Cl. ........................ 123/32 ST; 123/119 A; 60/278; 60/320
[51] Int. Cl.² .......................................... F02B 3/00
[58] Field of Search .................... 123/32 ST, 119 A; 60/278, 320

[56] References Cited

UNITED STATES PATENTS

| | | | |
|---|---|---|---|
| 3,768,787 | 10/1973 | Marsee | 60/278 UX |
| 3,776,212 | 12/1973 | Karlowitz | 123/32 ST X |
| 3,809,039 | 5/1974 | Alquist | 123/119 A |
| 3,890,946 | 6/1975 | Wahl | 60/276 |
| 3,946,558 | 3/1976 | Beekhuis | 60/278 |
| 3,955,362 | 5/1976 | Jones | 123/32 ST |

*Primary Examiner*—Edgar W. Geoghegan
*Attorney, Agent, or Firm*—Martin A. Farber

[57] ABSTRACT

An internal combustion engine combustion process in which fuel injected from an injection nozzle takes the form of liquid droplets distributed in a combustion chamber so that a slow burning of the combustion at relatively low maximum combustion temperature is achieved. An exhaust system of the engine has a section which acts as a heat insulator. This construction provides a proper environment for oxidation of exhaust gases.

8 Claims, 5 Drawing Figures

INTERNAL COMBUSTION ENGINE COMBUSTION PROCESS

This invention relates in general to internal combustion engines for motor vehicles and, more particularly, to a combustion process for a gasoline-powered internal combustion engine for effectively purifying engine exhaust gases.

As is well known, exhaust gases emitted from a gasoline-powered internal combustion engine contain noxious and harmful compounds such as nitrogen oxides, carbon monoxide and hydrocarbons which cause serious air pollution problems especially in urban areas. The emission of nitrogen oxides is reduced to a lower level when the maximum combustion temperature in a combustion chamber of the engine is maintained as low as possible. When, however, the maximum combustion temperature is maintained at an excessively low level, the power output of the engine is significantly reduced. On the other hand, the emission of the hydrocarbons and carbon monoxide is reduced by achieving oxidizing reaction of the engine exhaust gases in an exhaust system of the engine. In this expedient, if the temperature of the exhaust gases is at low level, the oxidizing reaction of the exhaust gases cannot be satisfactorily performed and, thus, it is difficult to reduce the content of the carbon monoxide and hydrocarbons.

Consequently, if the maximum combustion temperature is lowered with a view to reducing the emission of the nitrogen oxides contained in the engine exhaust gases, the temperature of the engine exhaust gases is lowered resulting in a high concentration of the hydrocarbons and carbon monoxide. If, on the other hand, the air to fuel ratio of an air-fuel mixture to be supplied to the engine combustion chamber is lowered with a view to prevent the reduction of the power output of the engine, the engine exhaust gases will contain high concentrations of the nitrogen oxides, hydrocarbons and carbon monoxide.

It will thus be seen that if one of the noxious compounds in the engine exhaust gases in intended to be reduced the concentration of other noxious compounds in the engine exhaust gases will increase and the power output of the engine will be decremented.

It is, therefore, an object of the present invention to provide a combustion process for a gasoline-powered internal combustion engine by which the maximum combustion temperature is maintained at a lower level whereas engine exhaust gases are maintained at a higher temperature whereby concentrations of nitrogen oxides, carbon monoxide and hydrocarbons in the engine exhasut gases are reduced.

It is another object of the present invention to provide a combustion process for a gasoline-powered internal combustion engine which is capable of reducing the concentrations of nitrogen oxides, carbon monoxide and hydrocarbons contained in engine exhaust gases without causing a sacrifice of an engine power output.

In order to achieve these objects, the present invention features that air or lean air-fuel mixture is introduced into a combustion chamber of an internal combustion engine into which only fuel in injected during the induction stroke of the engine. The fuel is dispersed in the air or lean air-fuel mixture introduced into the combustion chamber to provide a granulated (i.e. particulate) suspension of fuel droplets in the lean air fuel mixture, so that a rich air fuel mixture portion is formed in the combustion chamber. In such an air-fuel mixture in which rich and lean air fuel mixture portions are provided, combustion may take place at a lower speed; thereby the combustion temperature is decreased and consequently the concentration of nitrogen oxides is reduced. However, by lowering the combustion temperature, the power of the engine is decreased. In accordance with the present invention, no gas stagnating portion, such as for example a thermal reactor, is provided in the exhaust passage. Therefore, an exhaust gas inertia effect can be expected, by which a reduction of the power in the exhaust system may be prevented.

These and other objects, features and advantages of the present invention will become more apparent from the following description when taken in conjunction with the accompanying drawings, in which.

Figure 1:
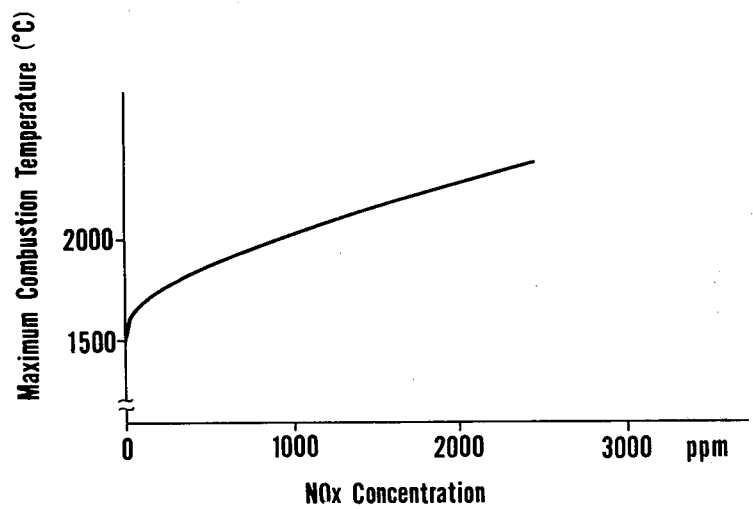
FIG. 1 is a graph illustrating the relationship between the maximum combustion temperature and the concentration of nitrogen oxides contained in engine exhaust gases.

In general, the concentration of nitrogen oxides contained in engine exhaust gases depends on the maximum combustion temperature of a cylinder of an internal combustion engine as shown in the graph of FIG. 1. As shown, the concentration of the nitrogen oxides in the engine exhaust gases significantly decrease as the maximum combustion temperature is reduced to a level below 2000° C. In order to reduce the concentration of the nitrogen oxides contained in the engine exhaust gases, it has been a usual practice to recirculate the engine exhaust gases or retard the spark ignition timing to thereby lower the maximum combustion temperature of the engine cylinder. With this prior expedient, however, a problem is encountered in that the power output of the engine is significantly reduced. This is particularly serious in a case in which it is necessary to reduce the concentration of the engine exhaust gases to a value below one fifth to one tenth that of the engine exhaust gases emitted from the conventional internal combustion engine.

On the other hand, when the maximum combustion temperature is maintained at a lower level, the temperature of the engine exhaust gases is also reduced to a lower level so that the other noxious compounds such as the hydrocarbons and carbon monoxide cannot be effectively reduced because of a reduced oxidizing reaction.

To solve these problems, it has heretofore been proposed to provide two expedients for performing the oxidization of the hydrocabons and carbon monoxide contained in the engine exhaust gases. One of these prior expedients is to supply secondary air into an exhaust system of the internal combustion engine to thereby oxidize the unburned compounds at the relatively low temperature, i.e., 350° to 500° C by using a catalyst. Another prior expedient is to forcibly supply secondary air into the exhaust system while providing an expansion chamber directly onto the exhaust port which expansion chamber is maintained at a temperature sufficient for effecting oxidizing reaction of the unburned compounds. This is so-called a thermal reactor system.

The former expedient has problems in that the catalyst is costly, there is fear of stable supply of the catalyst, unleaded gasoline must be used, there is fear that the use of catalyst may result in a secondary pollution and the interior temperature of the catalyst chamber becomes excessively high when a parcel of unburned gas resulting from misfire in the combustion chamber mixes with the hot remaining gases in the catalyst chamber. The thermal reactor system also has problems in that because the expansion chamber is provided adjacent, i.e., in the vicinity of the exhaust valve to minimize temperature drop of the exhaust gases, exhaust inertia effect will be ineffective since the exhaust gases are trapped for same time in the expansion chamber, thus causing reduction of the power output, a complicated secondary air supply system must be provided and the interior temperature of the expansion chamber becomes excessively high when a parcel of unburned gas mixes with the remaining hot exhaust gases in the expansion chamber causing them to burn.

Figure 2:
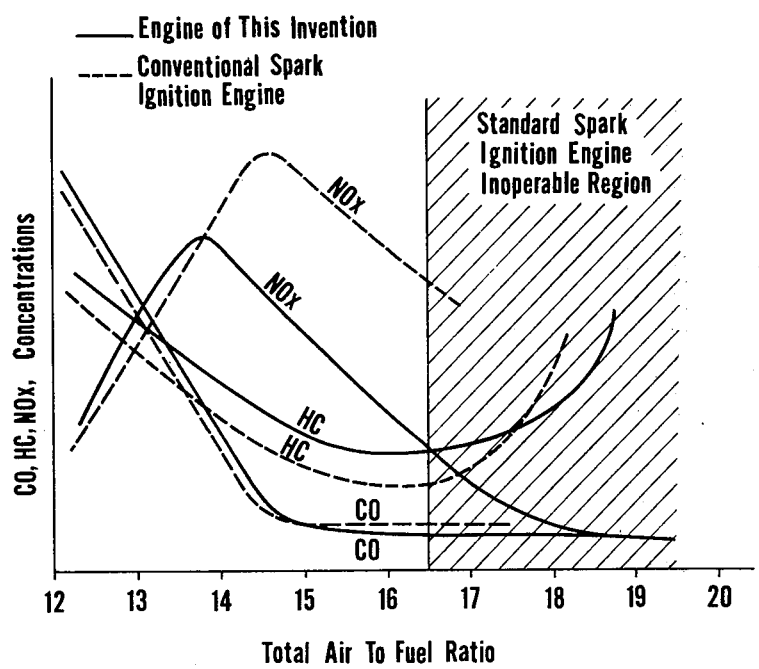
FIG. 2 is a graph illustrating the relationship between the air to fuel ratio and the concentrations of nitrogen oxides, carbon monoxide and hydrocarbons contained in engine exhaust gases.

As shown in FIG. 2, the concentrations of the noxious compounds in the engine exhaust gases are affected by the air to fuel ratio. Namely, as the air to fuel ratio decreases the concentrations of the noxious compounds will increase as shown in the graph of FIG. 2.

In known internal combustion engines, gasoline is mixed with air by a carburetor to provide an air-fuel mixture which is supplied into an engine cylinder. In this premixing process, the air-fuel mixture is chosen on the lean side with a view to reduce the concentration of the nitrogen oxides contained in the engine exhaust gases. In this case, it is difficult to achieve smooth combustion of the air-fuel mixture in the combustion chamber of the engine resulting in a decrease in the engine power output.

The present invention contemplates providing a combustion process in which air or a lean air-fuel mixture is supplied into an engine cylinder into which fuel is injected during an induction stroke of the engine. The fuel is dispersed and suspended (i.e., a floating state) in the air or lean air-fuel mixture in the combustion chamber in the form of droplets.

In this process, are fuel mixture portions having a optimum air-fuel ratio is formed around and between the droplets of fuel and the flame propagates in the mixture portions and further in the lean air fuel mixture in the combustion chamber. Thus even if the air fuel ratio of the supplied air fuel mixture is on the extremely lean side, the air fuel mixture can be satisfactorily burned in a stable manner. During this combustion process, the inner part of each droplet deprives or takes away evaporation heat from the burned gas as it evaporates, and after the evaporation of the fuel it is further burned. Thus, the combustion of the air and fuel mixture in the combustion chamber will be performed within a longer time period and, therefore, the maximum combustion temperature is suppressed resulting in a reduction of concentration of the nitrogen oxides contained in the engine exhaust gases.

Figure 3:
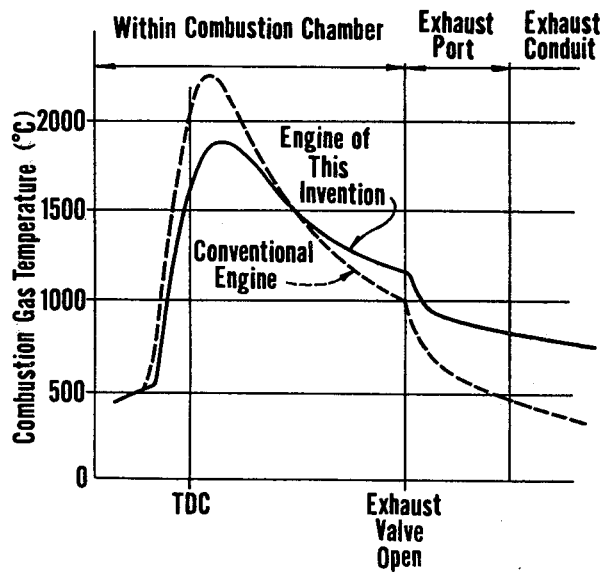
FIG. 3 is a graph illustrating the changes in temperatures of gases in engine cylinder, exhaust port and exhaust conduit.

The temperature of combustion gas obtained in the combustion process of the present invention will vary in a manner as shown in the graph of FIG. 3. In FIG. 3, the combustion gas temperature in the conventional internal combustion engine reaches a level of about 1000° C at a time instant just before the exhaust valve is opened and decreases to a level of about 800° C when the exhaust gases pass through the exhaust valve into the exhaust conduit as shown by a curve indicated by broken line in FIG. 3. When the exhaust gases reach the exhaust conduit, the temperature of the exhaust gases will be remarkably decreased due to heat dissipation to a level of about 350° to 500° C. In accordance with the combustion process of the present invention, on the contrary, the combustion gas temperature is at a level of about 1200° C before the exhaust valve is opened due to slow flaming propagation of the air and fuel mixture in the combustion chamber as shown by a solid curve in FIG. 3.

It will thus be seen that the exhaust gases passing through the exhaust valve are maintained at a relatively higher temperatue due to slow flaming propagation of the air and fuel mixture in the combustion chamber so that the noxious compounds such as hydrocarbons and carbon monoxide in the engine exhaust gases can be satisfactorily oxidized. Thus, it is possible to perform oxidizing reaction of the unburned compounds in the engine exhaust gases without the provision of additional catalyst or expansion chamber provided with a thermal reactor in the exhaust system of the internal combustion engine.

Figure 4:
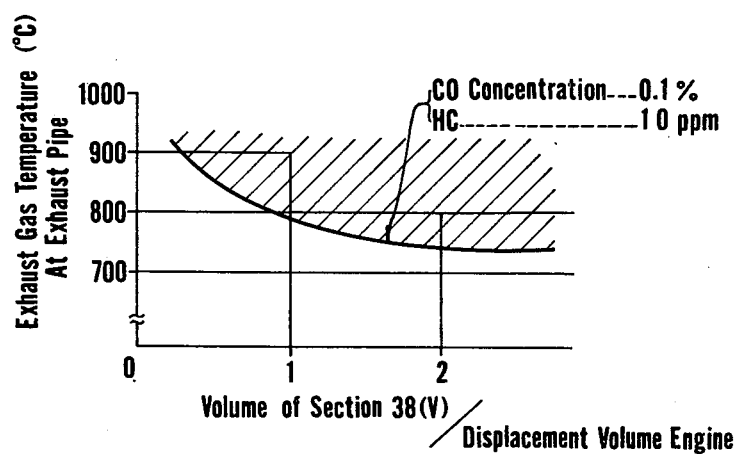
FIG. 4 is a graph illustrating the relationship between the temperature of engine exhaust gases in an exhaust pipe in terms of the ratio of the volume of the exhaust pipe section 38 to the displacement volume of the engine cylinder.

The tests have revealed that the temperature at which the oxidizing reaction of the engine exhaust gases will take place is dependent upon the volume of the exhaust pipe or conduit without any gas stagnating portion, through which the exhasut gases pass as shown in the graph of FIG. 4.

In FIG. 4, te absicssa indicates the ratio of volume of a predetermined zore of the exhaust pipe or conduit the displacement volume of the engine, and the ordinate represents the temperature of the engine exhaust gases. A curve is plotted in such that the carbon monoxide concentration is at a value of 0.1 percent and the hydrocarbon concentration is at a value of 10 ppm. In the hatched area above the curve, the concentrations of carbon monoxide and hydrocarbons are lower than the abovementioned values, respectively. It is to be noted in this instance that the above-noted result is based on the air-fuel mixture having air to fuel ratio ranging between 17:1 and 18:1.

As seen from the graph of FIG. 4, the concentration of the carbon monoxide is reduced to a value below 0.1 percent and the concentration of the hydrocarbons is reduced to a value below 10 ppm by maintaining the temperature of the engine exhaust gases at a level within the hatched area of FIG. 4.

As already discussed with reference to FIG. 3, in accordance with the present invention the temperature of the engine exhaust gases is maintained at a higher level before they leave the combustion chamber than compared with the conventional engine. The present invention features that the exhaust port is provided with a port liner to form a heat insulating spacing between the liner and the cylinder head and the exhaust pipe or conduit is provided with a heat insulating layer over a predetermined length of the exhaust pipe. With this constitution, the engine exhaust gases are maintained at a higher temperature than compared with the conventional engine, i.e., at a level of about 1000° C in the exhaust port and also mintained at the temperature of about 800° C in the exhaust pipe or conduit. Thus, it is possible to maintain the temperature of the engine exhaust gases at the level within the hatched area of FIG. 4. Accordingly, the concentrations of the carbon monoxide and hydrocarbons can be satisfactorily reduced to minimum values without the provision of the catalytic device or the thermal reactor in the exhaust system.

Since a gas stagnating portion such as a thermal reactor is not provided in the exhaust pipe, the inertia effect of the engine exhaust gases passing through the exhaust system is not sacrificed and, therefore, the reduction of engine power output is prevented. Since, in addition, the combustion process of the present invention does not utilize an expansion chamber in the exhaust system thus the engine exhaust gases will be gradually discharged in their same order of flow as they entered the exhaust port whereby excessive temperature rise in the exhaust system can be eliminated.

In accordance with the present invention, the total air to fuel ratio of the air-fuel mixture in the combustion chamber is set at a high value so that the engine exhaust gases will contain a sufficient amount of remaining oxygen and, therefore, the oxidizing reaction of the unburned compounds in satisfactorily performed. It is to be noted in this instance that in accordance with the combustion process of the present invention the misfiring of the air-fuel mixture in the combustion chamber is eliminated due to inherent combustion property so that the operability of the engine is not reduced. It should also be noted that the air to fuel ratio of the air-fuel mixture in the combustion chamber is preferably selected between 17:1 and 18:1 by which the reduction of the engine power output can be prevented.

Figure 5:
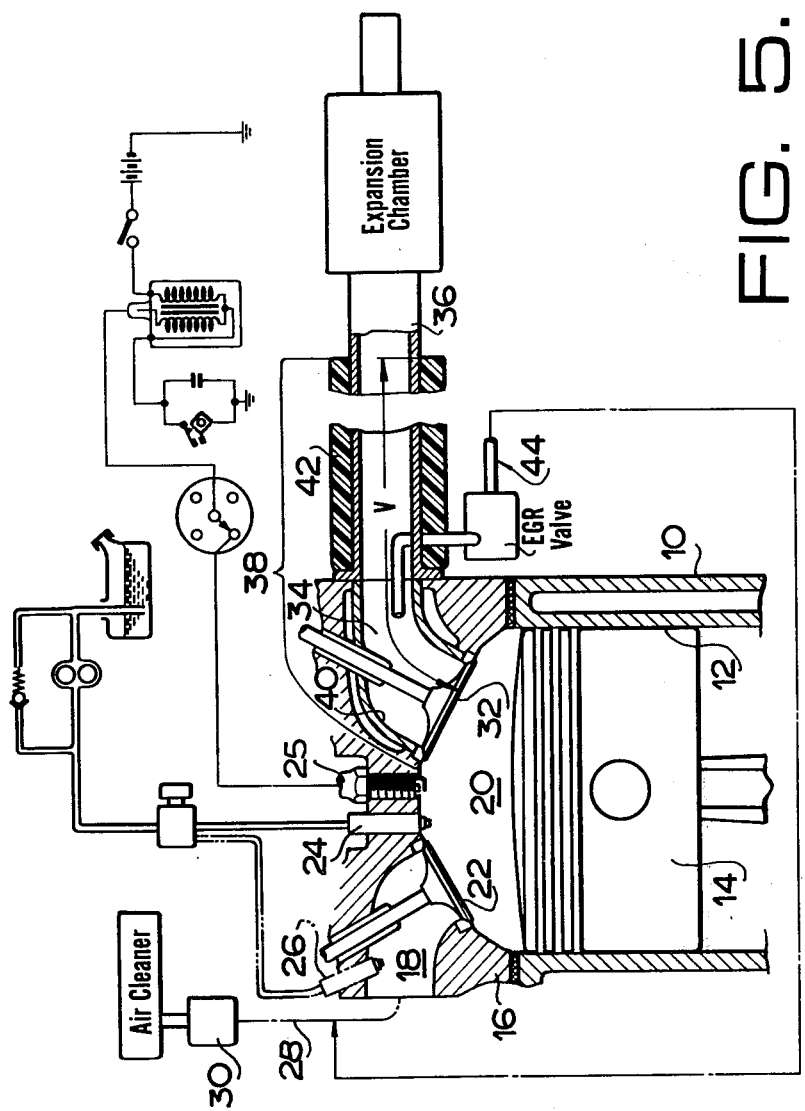
FIG. 5 is a section view of an internal combustion engine for carrying out a combustion process of the present invention.

Referring to FIG. 5, a gasoline-powered internal combustion engine for carrying out a combustion process of the present invention is shown. The engine comprises a cylinder block 10 having a cylinder bore 12 within which a piston 14 is reciprocately disposed. One end of the cylinder bore 12 is closed by a cylinder head 16 and the piston 14 is adapted to be reciprocated in the cylinder bore actuating a crank shaft and connecting rod, though not shown. The cylinder head 16 has an intake port 18 through which air or a lean air-fuel mixture is drawn into a combustion chamber 20 via an intake valve 22 during the induction stroke. A fuel injection nozzle 24 is opened to the combustion chamber to inject fuel directly into the combustion chamber 20. Alternatively, the injection nozzle 24 may be located at a position 26 indicated by dotted line in the vicinity of the intake valve 22 to inject fuel into the intake port 18. A spark plug 25 is supported in the cylinder head 16. The reference numeral 28 indicates an induction passage and the reference numeral 30 a carburetor to be connected to the induction passage 28 if a lean air-fuel mixture is to be supplied to the combustion chamber 20 via the intake valve 22.

The cylinder head 16 also has an exhaust valve 32 and an exhaust port 34 from which an exhaust system of the engine initiates. The exhaust system includes an exhaust conduit 36 having one end connected to the exhaust port 34. A predetermined zone 38 of the exhaust system is constructed so as to keep the exhaust gases passing therethrough hot enough to promote oxidations of hydrocarbons and carbon monoxide. The volume (V) of the zone 38 may be vaired as a function of the displacement volume of the engine and the temperature to obtain the necessary reduction of the HC and CO as shown in FIG. 4. The exhaust port 34 which forms part of the zone 38 has a dual wall construction with an inner liner 40 defining a passage for the exhaust gases and with a portion of the exhaust conduit 36 which forms the remaining part of the zone 38 being covered by a heat insulating material 42.

In operation, during the induction stroke, air or lean air-fuel mixture is drawn into the combustion chamber 20 via the intake valve 22 and fuel is injected during this stroke in the form of liquid droplets and is dispersed in this state in the air or lean air-fuel mixture in the combustion chamber 20 whereupon the fuel is ignited by the spark plug 25. This combustion enables the engine to operate on a relatively high total air to fuel ratio. During this combustion process, the inner part of each droplet takes evaporation heat away from the burned gas as it evaporates, and after this, the vapors of the fuel are further burned. The maximum combustion temperature thus is suppressed and a relatively slow burning during combustion is achieved, thus reducing the concentration of nitrogen oxides ($NO_x$). The exhaust gases are discharged into the zone 38 during the exhaust stroke via the exhaust valve 32 and pass through the zone 38 due to its inertia because there is not obstacle.

If the carburetor 30 is used, the air to fuel ratio of the fuel air mixture formed by the carburetor is chosen at a lean value greater than 19:1.

The total air to fuel ratio is preferably from 17:1 to 18:1 because CO and HC in the exhaust gases will be oxidized by the remaining oxygen in the exhaust gases and $NO_x$ generation will become low.

Preferably, an exhaust gas recirculation system 44 is provided in a known manner. When the exhaust gas recirculation system 44 is used, the total air to fuel ratio of the mixture supplied to the combustion chamber 20 can be decreased without the increase of $NO_x$ generation to improve the power output.

It will now be appreciated that since the exhaust inertia effect is not impaired according to the present invention, because no gas stagnating portion is provided in the exhaust pipe, whereby, there is no loss of power output. Furthermore, it will also be appreciated that the flow portions of the exhaust gases do not mix with each other as they pass through the exhaust system, because there is no enlarged expansion chamber nor gas stagnating portion and thus the flow portions pass through the exhaust system in the original order in which the flow portions entered the exhaust system. Therefore in accordance with the present invention, overheat of the exhaust conduit which would occur in the case of a thermal reactor system having an expansion chamber in the exhaust system in vicinity of exhaust port if one of the cylinder misfires, is prevented.

As described in the preceding, in accordance with the present invention reduction of $NO_x$ generation is achieved by the combustion of a heterogeneous mixture and the reduction of CO and HC emissions are achieved by providing proper environment for oxidation of CO and HC in the exhaust gases in the exhaust system.

What is claimed is:

1. An internal combustion engine having at least one cylinder, comprising
   a combustion chamber in each cylinder,
   an intake port communicating with a corresponding combustion chamber and provided with an intake valve,
   means for feeding air fuel mixture into said combustion chamber through said intake port,
   injection nozzle means for supplying fuel into said combustion chamber in the form of droplets in suspension in said mixture,
   a spark plug provided in said combustion chamber,
   an exhaust valve operatively communicating with said combustion chamber,
   an exhaust gas passage without a gas stagnating portion and communicating with said exhaust valve, and including a predetermined zone defining a volume, the latter extending from immediately adjacent said exhaust valve, said exhaust gas passage having an open end, and
   heat insulation means in said predetermined zone immediately adjacent to said exhaust valve for preventing exhaust gas temperature in said predetermined zone from lowering below a predetermined temperature, the latter being a function of the volume of said predetermined zone with respect to engine displacement volume so as to cause sufficient self-reaction oxidation in said predetermined zone in order to have HC concentration below 10 ppm and CO concentration below 0.1 percent.

2. An internal combustion engine as claimed in claim 1, in which said fuel air mixture has an air to fuel ratio greater than stoichiometric.

3. An internal combustion engine as claimed in claim 1, wherein
   said injection nozzle means injects the fuel into said combustion chamber during an induction stroke in said cylinder.

4. An internal combustion engine as claimed in claim 1, wherein
   said injection nozzle means injects the fuel into the air fuel mixture just after the latter is admitted into said combustion chamber.

5. An internal combustion engine as claimed in claim 1, wherein said air fuel mixture feeding means is a carburetor.

6. An internal combustion engine as claimed in claim 5, wherein
   said carburetor is set to provide an air fuel mixture having an air to fuel ratio greater than 91:1.

7. An internal combustion engine as claimed in claim 1, further comprising
   means in said exhaust gas passage for recirculating exhaust gases into said intake port.

8. A combustion process for an internal combustion engine having a combustion chamber, including a device for introducing air fuel mixture into the combustion chamber and a fuel injection nozzle for injecting fuel into the combustion chamber, and an exhaust passage defining a predetermined zone communicating with the combustion chamber, comprising the steps of
   introducing an air fuel mixture into the combustion chamber,
   injecting fuel into said combustion chamber into said air fuel mixture in the form of droplets dispersed in suspension in the air fuel mixture,
   igniting the air fuel mixture in the combustion chamber such that the air fuel mixture burns and the heat of combustion progressively evaporates the droplets, the evaporated portion of the droplets thereafter burning,
   removing exhaust combustion gases from the combustion chamber through the exhaust passage without gas stagnation in the same order of their flow therethrough as they entered the exhaust passage,
   insulating the predetermined zone of the exhaust gas passage and preventing the temperature of the exhaust combustion gases from lowering under a predetermined temperature, the latter being a function of the volume of the predetermined zone immediately after the combustion chamber with respect to engine displacement volume so as to cause sufficient self-reaction oxidation in the predetermined zone in order to obtain HC concentration below 10 ppm and CO concentration below 0.1 percent.

* * * * *

UNITED STATES PATENT AND TRADEMARK OFFICE
CERTIFICATE OF CORRECTION

PATENT NO. : 4031867
DATED : June 28, 1977
INVENTOR(S) : Hiroki Yasuda et al

It is certified that error appears in the above-identified patent and that said Letters Patent are hereby corrected as shown below:

Item [75] should read -- Hiroki Yasuda; Shuji Sawafuji; and Hitoshi Suzuki; all of Tokyo, Japan --.

In Column 3, line 54, this line should read:-- In this process, air fuel mixture portions having an --

In Column 4: line 40, "te" should be --the-- line 41, after "conduit" insert --to-- line 44, delete "in"

In Column 6: line 3, "vaired" should be --varied-- line 30, "not" should be --no--

Column 4, line 41, "zore" should read -- zone --.

Signed and Sealed this

Twenty-seventh Day of September 1977

[SEAL]

Attest:

RUTH C. MASON
*Attesting Officer*

LUTRELLE F. PARKER
*Acting Commissioner of Patents and Trademarks*